Patented Nov. 21, 1944

2,363,298

UNITED STATES PATENT OFFICE 2,363,298

SOLVENT EXTRACTION

Armand J. de Rosset, Chicago, Ill., assignor to Universal Oil Products Company, Chicago, Ill., a corporation of Delaware No Drawing. Application October 17, 1941, Serial No. 415,451

2 Claims. (Cl. 183—115)

This invention relates specifically to the separation of normally gaseous paraffins from normally gaseous olefins by means of a selective solvent.

It is often desirable to separate from a composite feed gaseous paraffins and gaseous olefins of the same number of carbon atoms, since there are a great many processes in which a gas predominantly olefinic or paraffinic in character is required. For example, in the catalytic sulfuric acid alkylation process in which iso-butane is alkylated by butylenes to form octanes, it is desirable that the feed gas to the process possess a relatively high ratio of iso-butane to olefin, since in this manner a more selective reaction may be effected. On the other hand, for the polymerization of $C_3$ and $C_4$ olefins, and particularly for the selective polymerization of $C_4$ olefins in heat exchange reactors, it is often desirable to have olefin contents as high as 50%. Therefore, in order to prepare charging stocks of such widely different composition from cracking plant gases, it is necessary to have a means of separating the paraffins from the olefins.

I have discovered that aliphatic amino alcohols exhibit a far greater solubility for the normally gaseous olefins than for the normally gaseous paraffins having the same number of carbon atoms. I propose therefore to use the liquid members of this series as selective solvents for the separation of normally gaseous paraffins from olefins.

In one specific embodiment this invention relates to a process for the separation of normally gaseous olefins from normally gaseous paraffins which comprises contacting a composite charge with an aliphatic amino alcohol, separating the resultant olefin rich extract from the paraffin-rich raffinate, and recovering an olefin-rich fraction from said olefin-rich extract.

In general, the aliphatic amino alcohols, which are employed in this process, are characterized by having at least one amino group and at least one hydroxyl group, each attached to the aliphatic structure. Examples of this type of compound are illustrated below:

TABLE I $HO-CH_2-NH_2$

Methanol amine $HO-CH_2-CH_2-NH_2$

Ethanol amine $HO-CH_2-CH_2-NH-CH_2-CH_2-NH_2$

Hydroxy ethyl ethylene diamine $CH_3-CH_2-CH_2-CH_2-NH-CH_2-CH_2-OH$ n-Butyl ethanol amine

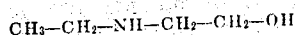

Ethyl ethanol amine

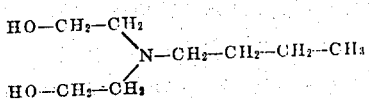

n-Butyl diethanol amine

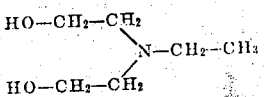

Ethyl diethanol amine

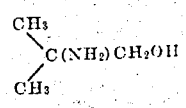

2-methyl 2-amino propan-3-ol

Each of the above compounds is liquid at room temperature and each is fairly stable. Furthermore, each compound contains at least one amino group and at least one hydroxyl group.

I have also observed that, as a rule, the selective solvent action of the amino alcohols toward olefins decreases as the number of hydrogen atoms attached to a nitrogen atom is decreased. For this reason an alcohol having a primary amino group attached is usually more selective than one having only a secondary amino group, the latter in turn being more selective than one having only a tertiary amino group. This behavior on the part of these compounds may possibly be explained in theory, at least, by an affinity for olefinic bonds exerted by the hydrogen atom attached to the nitrogen atom. Therefore, alcohols having primary or secondary amino groups are preferred. In some cases substituted amino alcohols, having a group such as an aryl radical, halogen radical, etc. linked to the aliphatic chain, may be employed as the solvents for this process. Ordinarily, however, the unsubstituted amino alcohols are preferred because of their relative ease of manufacture, their lower molecular weight, etc.

The solvents are employed in the liquid phase, although the normally gaseous hydrocarbons may be treated either in the vapor or in the liquid phase. According to one mode of operation, when the hydrocarbons are in the vapor phase, the latter are passed upward through an absorber countercurrently to the solvent, the lean gas or raffinate being withdrawn from the top of the absorber and the rich liquid or extract from the bottom. Thereafter the extract may be heated and flashed or treated in any other suitable manner to separate the desired concentrated olefinic fraction from the solvent. The solvent may then be returned to the top of the absorber to complete the cycle. Liquid phase operation, that is, operation in which two liquid phases are present with or without the presence of a vapor phase, may also be employed. In either the vapor or the liquid phase operation, more than one extraction stage may be used, if desired. In any event, the raffinate is richer in paraffins and the extract richer in olefins than the composite feed.

The following data are given to show the solubilities of various gaseous hydrocarbons in some of the above solvents. In Tables II, III and IV solubilities obtained by contacting the pure hydrocarbon in the vapor state with several of the liquid solvents of the aliphatic amino alcohol type are presented. In these tables the solubilities are expressed in terms of the Bunsen coefficient $\alpha$. This coefficient is defined as the volume of gas dissolved (corrected to 760 mm. pressure and 0° C.) per unit volume of solvent at the temperature of the experiment, in this case 25° C., when the partial pressure of the gas is 760 mm.

TABLE II

Solvent—ethanol amine. Vapor phase solvent extraction

| Hydrocarbon | Solubility at 25° C., $\alpha$ |
|---|---|
| Ethane | 0.23 |
| Ethylene | 0.36 |
| Propane | 0.39 |
| Propylene | 0.82 |
| n-Butane | 0.97 |
| 1-butene | 2.11 |

TABLE III

Solvent—hydroxyethyl ethylene diamine. Vapor phase solvent extraction

| Hydrocarbon | Solubility at 25° C., $\alpha$ |
|---|---|
| Ethane | 0.075 |
| Ethylene | 0.158 |
| Propane | 0.67 |
| Propylene | 0.74 |
| n-Butane | 0.98 |
| 1-butene | 2.60 |

TABLE IV

Solvent—2 methyl 2 amino propan-3-ol. Vapor phase solvent extraction

| Hydrocarbon | Solubility at 25° C., $\alpha$ |
|---|---|
| n-Butane | 8.14 |
| 1-butene | 11.86 |

Table V below shows the solubilities of the hydrocarbons as determined by contacting the pure hydrocarbon in the liquid phase at 25° C. at the pressure at which three separate phases exist, namely, a hydrocarbon in solvent phase, a solvent in hydrocarbon phase, and a vapor phase, principally hydrocarbon. It is evident that in cases where the solvent is relatively non-volatile and where the liquid phase solubilities are not very high, this pressure is approximately the same as the vapor pressure of the pure hydrocarbon at the temperature of the experiment. Furthermore, this pressure is the only pressure at which these three phases may exist, according to the phase rule (when the temperature is constant). In this table the solubility $c$ is expressed as the volume of gaseous hydrocarbon (reduced to 0° C. and 760 mm.) dissolved in a unit volume of the solvent at 25° C. and at the pressure of the experiment.

TABLE V

Liquid phase solvent extraction

| Hydrocarbon | Solvent | |
|---|---|---|
| | Ethanol amine | Hydroxyethyl ethylene diamine |
| | Solubility at 25° C., $c$ | |
| n-Butane | 2.40 | 3.79 |
| 1-butene | 7.19 | 10.54 |

It is apparent from the above data that in every case the solubility of the olefin, whether in the vapor or the liquid phase, is considerably greater than that of the paraffin. These solvents are therefore highly suited for a separation of normally gaseous paraffins from normally gaseous olefins. It is also evident from the data, however, that the solvents are not strictly equivalent.

Although this invention has been directed primarily toward the separation of normally gaseous paraffins from olefins, it is not to be unduly limited thereto since other types of normally gaseous hydrocarbons may also be separated by these solvents. For example, the solvents may be employed in the separation of normally gaseous paraffins from diolefins or acetylenes as well as in the separation of normally gaseous monoolefins from the corresponding diolefins or acetylenes.

I claim as my invention:

1. A process for separating normally gaseous olefins from normally gaseous paraffins in a hydrocarbon mixture containing the same, which comprises treating said mixture with a sufficient quantity of hydroxyethyl ethylene diamine to form an olefin-rich extract and a paraffin-rich raffinate, and separately recovering said extract and raffinate.

2. A process for separating normally gaseous olefins from normally gaseous paraffins in a hydrocarbon mixture containing the same, which comprises treating said mixture with a selective solvent consisting essentially of hydroxyethyl ethylene diamine to form an olefin-rich fraction and a paraffin-rich fraction, and separately recovering said fractions.

ARMAND J. DE ROSSET.